(12) United States Patent
Schwarz

(10) Patent No.: US 7,583,373 B2
(45) Date of Patent: Sep. 1, 2009

(54) GEODETIC TOTAL STATION WHICH CAN BE EXTENDED IN A MODULAR MANNER

(75) Inventor: Johannes Schwarz, Widnau (CH)

(73) Assignee: Leica Geosystems AG, Heerbrugg (CH)

( * ) Notice: Subject to any disclaimer, the term of this patent is extended or adjusted under 35 U.S.C. 154(b) by 158 days.

(21) Appl. No.: 11/814,752

(22) PCT Filed: Jan. 19, 2006

(86) PCT No.: PCT/EP2006/050318

§ 371 (c)(1),
(2), (4) Date: Aug. 31, 2007

(87) PCT Pub. No.: WO2006/079604

PCT Pub. Date: Aug. 3, 2006

(65) Prior Publication Data

US 2008/0094606 A1    Apr. 24, 2008

(30) Foreign Application Priority Data

Jan. 26, 2005    (EP)    ................... 05001531

(51) Int. Cl.
*G01C 1/00*    (2006.01)
*G01C 3/08*    (2006.01)
*G02B 23/00*    (2006.01)

(52) U.S. Cl. .................... 356/141.2; 356/4.01; 359/399

(58) Field of Classification Search ................ 356/4.01, 356/141.1, 141.2, 141.5; 359/399
See application file for complete search history.

(56) References Cited

U.S. PATENT DOCUMENTS

| | | | |
|---|---|---|---|
| 5,760,748 A | 6/1998 | Beckingham | |
| 5,821,900 A | 10/1998 | Kishimoto | |
| 6,014,109 A | 1/2000 | Raby | |
| 6,175,328 B1 * | 1/2001 | Ericsson et al. | 342/357.08 |
| 2008/0018880 A1 * | 1/2008 | Matsuo et al. | 356/4.01 |
| 2008/0120856 A1 * | 5/2008 | Matsuo et al. | 33/299 |

(Continued)

FOREIGN PATENT DOCUMENTS

DE    19635591    3/1997

(Continued)

*Primary Examiner*—Isam Alsomiri
(74) *Attorney, Agent, or Firm*—Workman Nydegger

(57) ABSTRACT

A geodetic total station comprising an upper part (1*a*) provided with a support (2) with at least one support section (2*a;* 2*b*), an electronic display control unit (4), a total station data interface (6) provided with electrical contact elements (6*a*), and a top attachment (20) that is mechanically coupled above the support (2) and the telescope (3), in a detachable manner, by means of at least one mechanical support interface (8*a;* 8*b*) and at least one corresponding mechanical top attachment interface (21*a;* 21*b*). The total station data interface (6) is arranged on the support section (2*a;* 2*b*), and the top attachment (20) receives the peripheral components and has a top attachment data interface (23) which comprises electrical contact elements (23*a*) and is connected to the peripheral components in a data-transmitting manner. The mechanical support interface (8*a;* 8*b*), the mechanical top attachment interface (21*a;* 21*b*), the total station data interface (6), and the top attachment data interface (23) are arranged in such a way that the contact elements (6*a,* 23*a*) of the total station data interface (6) and the top attachment data interface (23) are brought into mutual electrical contact by the coupling of the top attachment (20) to the support section (2*a;* 2*b*).

20 Claims, 6 Drawing Sheets

U.S. PATENT DOCUMENTS

2008/0297760 A1 * 12/2008 Herbst et al. ............... 356/4.01

FOREIGN PATENT DOCUMENTS

| | | |
|---|---|---|
| EP | 0423162 | 4/1991 |
| EP | 0481307 | 4/1992 |
| EP | 0892245 | 1/1999 |
| JP | 4212012 | 8/1992 |
| JP | 2001033251 | 2/2001 |
| WO | WO9000719 | 1/1990 |

* cited by examiner

GEODETIC TOTAL STATION WHICH CAN BE EXTENDED IN A MODULAR MANNER

This application is a 371 of PCT/EP06/50318 filed Jan. 19, 2006.

The invention relates to a geodetic total station for the optical measurement of horizontal angles, vertical angles and distances according to the precharacterizing clause of Claim 1 and a top attachment of a rotatable upper part of a geodetic total station according to the precharacterizing clause of Claim 9.

Total stations for the electrosensory measurement of angles and distances have long been known from the prior art and are also referred to as electronic tacheometers or computer tacheometers. Modern total stations have efficient microprocessors for digital further processing and storage of acquired measured data. The devices are as a rule produced in compact and integrated design, in general coaxial distance- and angle-measuring elements and computational, control and storage units being integrated in one device. Depending on the expansion stage of the total station, means for motor operation of the sighting optical system, for reflectorless distance measurement, for automatic target finding and tracking and for remote control of the entire device are integrated. Total stations disclosed in the prior art furthermore have a data interface for the connection of external peripheral components, for example a radio receiving and/or transmitting unit, a GPS antenna, a personal computer, in particular a notebook, or a minicomputer, in particular a PDA. The data interface is as a rule in the form of a serial interface according to the standard RS-232 and has a data link to the microprocessor unit of the total station. By means of the data interface, it is possible to output measured data acquired and stored by the total station for external further processing, to read externally acquired measured data into the total station for storage and/or further processing, to input or output remote control signals for remote control of the total station or of an external component, in particular in mobile field use, and to transfer control software to the total station.

The data interface is particularly important on extension of the total station with additional peripherals for particular measuring tasks in field use. Since the customer expectations with regard to a total station and the fields of use vary greatly, the integration of components which are required only from case to case by customers or are subject to country-specific— in particular legal—limitations, for example homologations, is often not expedient, and in these cases external additional peripherals which are connected to the total station via the data interface are therefore relied upon. Radio receiving and/or transmitting units which, owing to national radio standards and statutory telecommunications or broadcasting provisions, are in the form of external peripheral components which can be connected to the total station are an example of this. Thus, complicated conversion of the total station for export of the device can be dispensed with since only the external radio unit need be replaced. However, the external arrangement of a radio unit contradicts the principle of the total station, namely the integration of all elements in a single device.

In addition, it is possible, as described, for example, in U.S. Pat. No. 5,821,900 or EP 0 892 245 A3, to connect an external satellite position determination unit having a satellite signal receiving antenna, in particular for receiving GPS, GLONASS or GALILEO signals, via the external data interface to the total station and hence to feed satellite position signals, by means of which the absolute position of the total station can be determined, to the microprocessor unit. Since the accuracy of position determination based on the reception of satellite signals alone is between 5 and 10 meters, as a rule a radio receiving unit for receiving correction data, in particular according to the RTK or DGPS standard, is connected to the data interface or the satellite determination unit, with the result that the accuracy of position determination can be increased to below 5 millimetres.

The known, universally usable date interfaces suitable for field use are arranged on the side of the support or alhidade of the total station, directly on the display unit or on the lower part of the total station. A particular problem is the protection of the unoccupied data interface from contamination or moisture. Caps or plugs serve for closing the data interface. However, there is the danger that, after removal of the external peripheral component, the closing of the data interface will be forgotten. Self-closing covers for the data interface are relatively inconvenient to handle and are easily damaged.

Furthermore, the prior art discloses that theodolites or total stations can be equipped with a removable bow handle above the alhidade on the top of the two supports, between which the telescope is arranged. JP 04212012 A describes a total station having a removable bow handle in which a battery for the power supply of the total station is integrated. EP 0 481 307 A2 (Asahi Seimitsu Kabushiki Kaisha) describes a measuring apparatus in the form of a total station having a removable battery, likewise in the form of a removable bow handle, which is mounted above the alhidade on the top of the two supports. A GPS receiver can be fixed on the bow handle by means of a detachable mechanical interface in such a way that the vertical axis passes through the centre of the GPS antenna.

EP 0 423 162 B1 (Leica Heerbrugg AG) describes a terrestrial surveying system comprising a total station and a satellite position measuring unit with a receiver which can be connected to the total station by means of positive centring in a decouplable manner and uniquely with regard to its geometrical relative position, the total station and the satellite position measuring unit being connected to one another by a wireless data transmission device. Since the data transmission takes place wirelessly, a wired data interface can be dispensed with. However, the apparatus disclosed requires an additional wireless data transmission device which is subject to the national statutory broadcasting provisions and complicates the design of the entire apparatus.

U.S. Pat. No. 6,014,109 discloses a total station having at least one satellite signal antenna fixed relative to the vertical axis eccentrically above the support of the upper part on the total station.

DE 196 35 591 A1 (Nikon Corp.) discloses a total station in which a GPS receiving unit is detachably connected to the side of a support of the alhidade with the use of a connector. A GPS antenna is likewise detachably mounted on the holding bow on the top of the total station. The GPS antenna is connected to the GPS receiving unit via an antenna cable.

U.S. Pat. No. 5,760,748 (Beckingham et al.) describes a C-shaped holding bow which is fastened between the base of a total station and a tripod, for mounting a satellite navigation antenna above the total station, in the vertical axis thereof.

The extension of a total station with external peripheral components employed in field use is problematic in particular with regard to the handling properties of the total station, since not only must the peripheral component have a data link to the total station but there must also be a mechanical connection. Firstly, it is possible to connect the peripheral component to the tripod or the lower part of the total station. Since in this case the external peripheral component does not follow the alhidade of the total station and a cable connected to the data interface arranged on the alhidade has to be trailed, this variant has proved to be disadvantageous. For this reason, the arrangement of numerous external peripheral components is effected in the prior art directly on the side of the alhidade. However, this imposes a load on the alhidade on one side, which presents a considerable problem especially in the case of high-precision instruments. Moreover, the handling properties of the total station are adversely affected as a result.

The provision of modular extendibility of a total station inevitably requires equipping the total station with data interfaces and mechanical interfaces. However, the presence of these interfaces must not adversely affect the handling properties of a total station in the basic configuration. The interfaces should therefore firstly be arranged as far as possible in a concealed and protected manner in the unextended state but, for modular extendibility of the total station, should be housed in a location which is easily accessible from the ergonomic point of view and permits the ergonomically expedient arrangement of a peripheral component without the functionality, handling properties or precision of measurement of the total station being reduced as a result. In the state extended in a modular manner, too, the total station should be identical to a total station having an integrated design. This apparent conflict of aims has not been satisfactorily resolved to date.

The object of the invention is therefore to provide a total station which can be extended in a modular manner and, starting from a basic total station configuration which corresponds to the average customer wishes and has no data interfaces and mechanical interfaces limiting the handling properties of the total station in field use, can be extended and/or converted in a modular manner to meet special customer wishes or requirements so that the extended total station is identical to an integrated design.

This object is achieved by realising the characterizing features of the independent claims. Features which further develop the invention in an alternative or advantageous manner are described in the dependent patent claims.

The geodetic total station for the optical measurement of horizontal angles, vertical angles and distances to a target point a distance away has, in the generic manner, an upper part which is rotatable about a vertical axis and is also referred to as the alhidade. The upper part comprises a support having at least one support section, especially two support sections, between which a sighting telescope which is rotatable relative to the support about a horizontal tilting axis and by means of which the target point can be sighted and the horizontal angle of the upper part about the vertical axis, the vertical angle of the telescope about the tilting axis and the distance from the telescope to the target point can be detected by electrosensory means is arranged. The telescope comprises, in addition to the sighting optical system, an electrosensory rangefinder, in particular a laser rangefinder coaxial with the optical axis. The support is preferably in the form of a fork open at the top. Those sections, in particular two sections of the support, which extend substantially vertically and by which the telescope rotatable about the tilting axis is supported are referred to here as support sections. The totality of the support sections and the mutual fastening thereof form the support, which thus forms the substantial component of the upper part. However, it is also possible to use only one support section, but the person skilled in the art knows that the accuracy of measurement decreases considerably as a result. Furthermore, an electronic display control unit to which the measured data acquired by electrosensory means is fed is present on the upper part, so that the position of the target point can be determined, can be optically displayed and in particular can be stored by the display control unit. In general, the display control unit is understood as meaning a microprocessor computing unit having electronic data storage means and a man-machine interface, in particular in the form of a display and a keyboard. The display control unit may have a plurality of parts.

According to the invention, at least one total station data interface having a data link to the display control unit and possessing electrical contact elements, for permitting a data link to at least one peripheral component, is present on the upward-pointing side of the at least one support section. Upward-pointing is to be understood as meaning that side of the support section which, on normal orientation of the total station, points with the vertical axis in the direction of the zenith, i.e. the top of the support section or the top of the alhidade. A mechanical support interface is also provided on this upward-pointing side of the at least one support section. In the case of two support sections, mechanical support interfaces are preferably present on both upward-pointing sides of the two support interfaces, and the total station data interface on at least one upward-pointing side. Of course, the upward-pointing side need not be a flat surface or side. The upward-pointing side is to be understood in general as meaning the upper section of the support section, which may also have, for example, a conical shape. The total station data interface and the mechanical support interfaces can therefore also be present on the side of the upper section of the support section.

A top attachment is detachably coupled mechanically above the support and the telescope. This detachable connection is effected by means of the at least one mechanical support interface arranged on the upward-pointing side of the at least one support section, and at least one corresponding mechanical top attachment interface. Preferably, the top attachment is in the form of a U-shaped part which in its basic form is open at the bottom and has two vertical limbs, on the downward-pointing sides of each of which a mechanical top attachment interface is formed, the design and position of the top attachment interfaces being such that the mechanical support interfaces and the mechanical top attachment interface permit a mutual, in particular frictional or interlocking detachable connection. In this case, the top attachment connects the upper ends of the two support sections. Preferably, at least one of the mechanical interfaces has a locking mechanism by means of which the corresponding mechanical interfaces can be mechanically connected so that they are firmly locked to one another and can be released again.

The top attachment comprises at least one peripheral component and at least one top attachment data interface which has electrical contact elements and possesses a data link to the peripheral component. According to the invention, the at least one mechanical support interface, the at least one mechanical top attachment interface, the at least one total station data interface and the at least one top attachment data interface are arranged and formed in such a way that the contact elements of the total station data interface and the contact elements of the top attachment data interface make mutual electrical contact by coupling of the top attachment to the support interface. The establishment of electrical contact is preferably effected with positive guidance via the mechanical interfaces. However, it is alternatively also possible to separate the mutual coupling of the mechanical interfaces and the mutual coupling of the electrical data interfaces kinematically by, for example, using a locking mechanism for the mechanical interfaces as well as a locking mechanism for the data interfaces.

In an alternative embodiment, the mechanical interfaces and the data interfaces are formed as a common interface in that mechanical connecting elements simultaneously serve as electrical contact elements.

The peripheral component which has a data link to the display control unit at least via the top attachment data interface and the total station data interface is formed, for example, by a radio receiving unit for receiving radio signals, a satellite position determination unit, in particular a GPS receiving unit, for receiving satellite signals, or a radio transmitting unit for transmitting radio signals. However, the peripheral component is to be understood generally as meaning any element which has a direct or indirect data link to the display control unit via the data interfaces. This may be in particular a geodetic gyroscope, an electronic compass, a sensor for measuring atmospheric measured variables, in particular temperature, air pressure and relative humidity, an active reflector, a rotational laser, a further microprocessor unit, a display unit or a storage medium. Furthermore, it is possible for the top attachment to have a plurality of peripheral components which have a data link to the display control unit and/or to one another.

The top attachment component may be in the form of one part or a plurality of parts. In a possible embodiment, the top attachment component is composed of an adaptor bow which is arranged above the support and comprises the top attachment data interface, and at least one separate peripheral component detachably connected to the adaptor bow. A mechanical adaptor bow interface, a mechanical peripheral component interface, an adaptor bow data interface and a peripheral component data interface are arranged and formed in such a way that electrical contact elements of the adaptor bow data interface and electrical contact elements of the peripheral component data interface make mutual electrical contact by coupling the peripheral component to the adaptor bow—in particular with positive guidance—so that a data link is permitted between the peripheral component and the display control unit via the peripheral component data interface, the adaptor bow data interface, the top attachment data interface and the total station data interface.

In the standard configuration of the total station, the top attachment can be in the form of a simple holding bow as known from the prior art, having only two mechanical interfaces which correspond to the mechanical top attachment interfaces. Instead of a top attachment data interface, a space is formed in the holding bow. Since the holding bow covers the total station data interface, this is always protected from mechanical influences and moisture and is inconspicuously concealed. The penetration of moisture can additionally be avoided by a sealing lip integrated in the holding bow or on the upward-pointing side of the support section. A substantial advantage of the invention is that the upper mechanical support interface in a total station of basic configuration can be used for coupling a simple holding bow and thus concealed by said holding bow, at the same time the total station data interface also being concealed, and accessories in the form of a top attachment with at least one either integrated or likewise coupled peripheral component can be connected on extension of the total station by removing a simple, economical part, the holding bow. Since a standard part coordinated with the total station in the basic configuration can be exchanged for the top attachment which, owing to the peripheral component integrated there, has an additional functionality, the integrated design of the total station is preserved since modules coupled externally to the housing of the total station can be omitted. This is because, owing to the exchange with the holding bow, the top attachment is an optical, functional and ergonomic component of the total station. Mechanical interfaces which are visible in standard operation can be omitted. A further advantage of the invention is that, by arranging the top attachment within the vertical axis, in an embodiment having the centre of gravity in the vertical axis, asymmetric loading of the upper part of the total station is avoided and peripheral components can be positioned in a location accessible from the side and from above. This proves to be particularly advantageous especially when the additional component is in the form of a radio unit, in particular in the form of a GPS receiving unit.

BRIEF DESCRIPTION OF THE DRAWINGS

The apparatuses according to the invention are described in more detail below, purely by way of example, with reference to specific working examples shown schematically in the drawings, further advantages of the invention also being discussed. Specifically:

FIGS. 1a, 1b and 1c show, in a purely schematic diagram not to scale, a first possible embodiment of the total station according to the invention in different coupling states, views and degrees of detail. The three figures are explained together below. A geodetic total station for the optical measurement of horizontal angles, vertical angles and distances to a target point a distance away has an upper part 1a rotatable about a vertical axis V. The upper part 1a is composed of a support 2 having a right support section 2a and a left support section 2b, a sighting telescope 3 mounted between said support sections so as to be rotatable about the horizontal tilting axis H, an electronic display control unit 4 arranged on both sides of the upper part 1a and a top attachment 20a. By means of the sighting telescope 3, the target point can be sighted and the distance from the total station to the target point can be determined by electrosensory means. Furthermore, means (not shown) for the electrosensory detection of the angular orientation of the upper part 1a and of the sighting telescope 3 are provided. These measured data acquired by electrosensory means are fed to the display control unit 4 and processed by it so that the position of the target point relative to the total station can be determined, optically displayed and in particular stored by the display control unit 4. Mechanical support interfaces 8a and 8b which are formed by in each case two parallel hook racks are arranged on the two upward-pointing sides 7a and 7b of the right support section 2a and of the left support section 2b. Between the two hook racks of the right support interface 8a, a total station data interface 6 having a data link to the display control unit 4 and possessing electrical contact elements 6a for permitting a data link to at least one peripheral component is present on the upward-pointing side 7a.

The top attachment 20a has a U-shape open at the bottom and possesses a right mechanical top attachment interface 21a corresponding to the right mechanical support interface 8a and a left mechanical top attachment interface 21b corresponding to the left mechanical support interface 8b. By means of these last-mentioned mechanical interfaces, the top attachment 20a can be detachably coupled mechanically above the support 2 and the sighting telescope 3 so that the top attachment 20a mechanically connects the two support sections 2a, 2b at the top. FIGS. 1a and 1c show the decoupled state, while FIG. 1b shows the coupled state. For decoupling, unlocking mechanisms 22a, 22b are provided for both top attachment interfaces 21a, 21b, by means of which unlocking mechanisms the interlocking connection can be released again and hence the top attachment 20a can be released from the support 2.

The top attachment 20a furthermore comprises a peripheral component which is in the form of a radio receiving unit 40 and a radio transmitting unit 44, and a top attachment data interface 23 having electrical contact elements 23a which have a data link to the radio receiving unit 40 and the radio transmitting unit 44 via an electrical connection 46. An antenna 47 serves for receiving and transmitting radio signals 41 and 45, respectively. The two mechanical support interfaces 8a, 8b, the two mechanical top attachment interfaces 21a, 21b, the total station data interface 6 and the top attachment data interface 23 are each arranged and formed in such a way that the contact elements 6a of the total station data interface 6 and the contact elements 23a of the top attachment data interface 23 make mutual electrical contact by coupling the top attachment 20a to the two support interfaces 2a, 2b, as illustrated in FIG. 1c and implemented in FIG. 1b. Thus, in the coupled state (cf. FIG. 1b), the radio receiving unit 40 and the radio transmitting unit 44 have a data link via the top attachment data interface 23 and the total station data interface 6 to the display control unit 4, so that it is possible, for example, to send remote control signals from a remote control (not shown) to the total station and to send measured data acquired by the total station to the remote control. The power supply of the radio receiving unit 40 and of the radio transmitting unit 44 is provided via the total station data interface 6 or, in an alternative embodiment, via a battery integrated in the top attachment 20a. The antenna 47 of the radio receiving unit 40 and of the radio transmitting unit 44 is present above the remaining total station, so that optimum transmitting and receiving properties are ensured.

The top attachment 20a can easily be replaced by another top attachment having radio modules which correspond to another radio standard. The adaptation of the total station to national regulations is therefore possible without problems. Moreover, the top attachment 20a can be replaced by a simple holding bow (not shown) which corresponds optically to the top attachment 20a but has neither a top attachment data interface 23 nor a peripheral component and which, in the state of the total station when the latter is not extended in a modular manner, conceals the total station data interface 6 and protects it from damage and dirt. The mechanical support interfaces 8a, 8b serve in this case indirectly for transporting the total station by means of the holding bow.

Figure 1A:
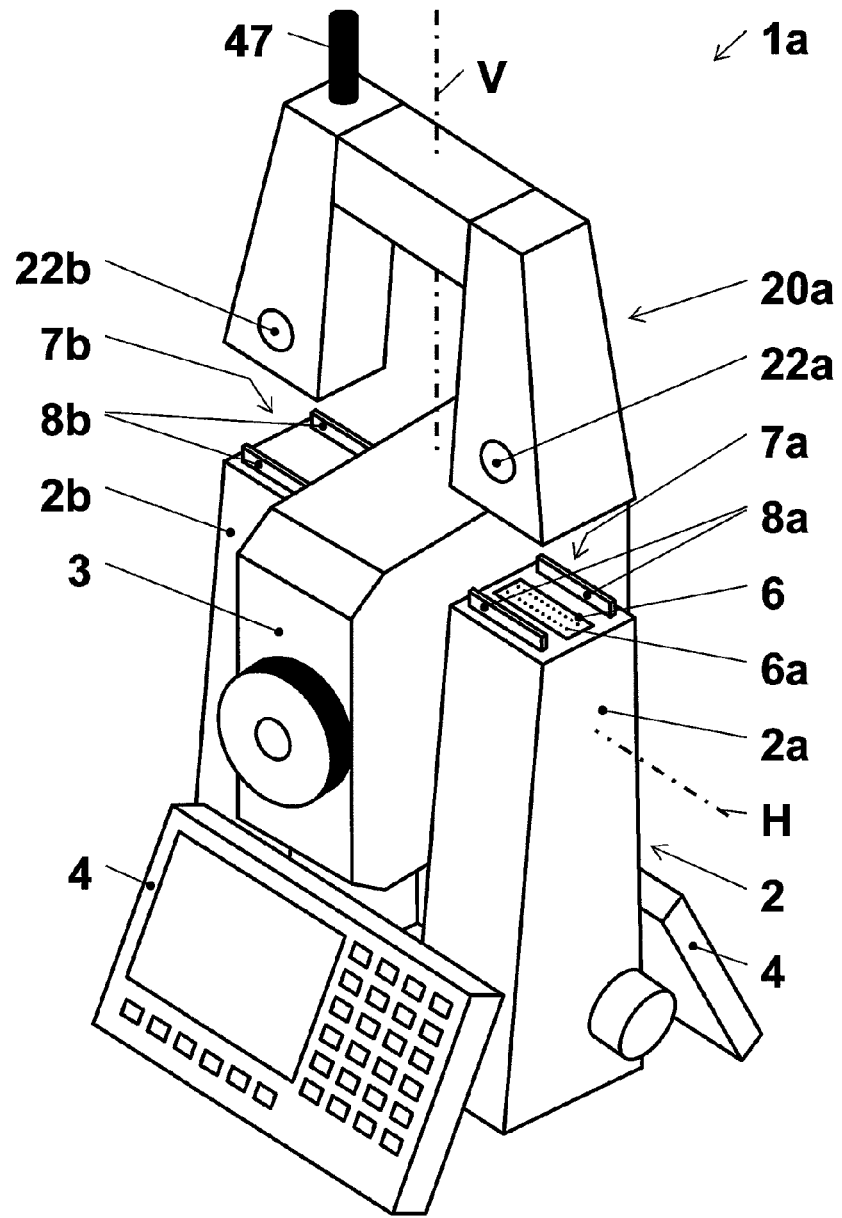
FIG. 1a shows a geodetic total station comprising a top attachment which has a peripheral component in the form of a radio receiving unit and radio transmitting unit, in the decoupled state, in an oblique view.
Figure 1B:
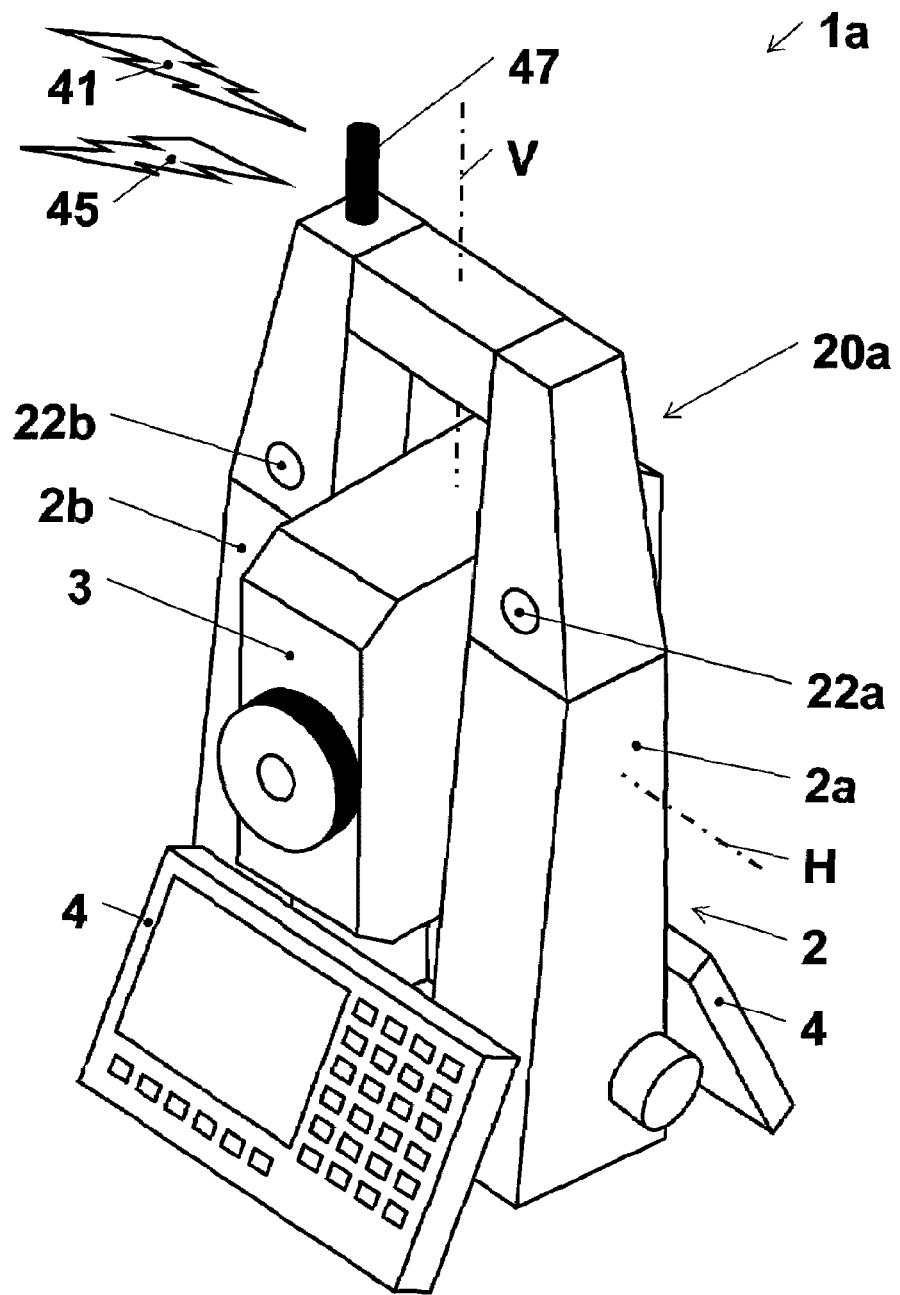
FIG. 1b shows the geodetic total station of FIG. 1a with the top attachment in the coupled state, in an oblique view.
Figure 1C:
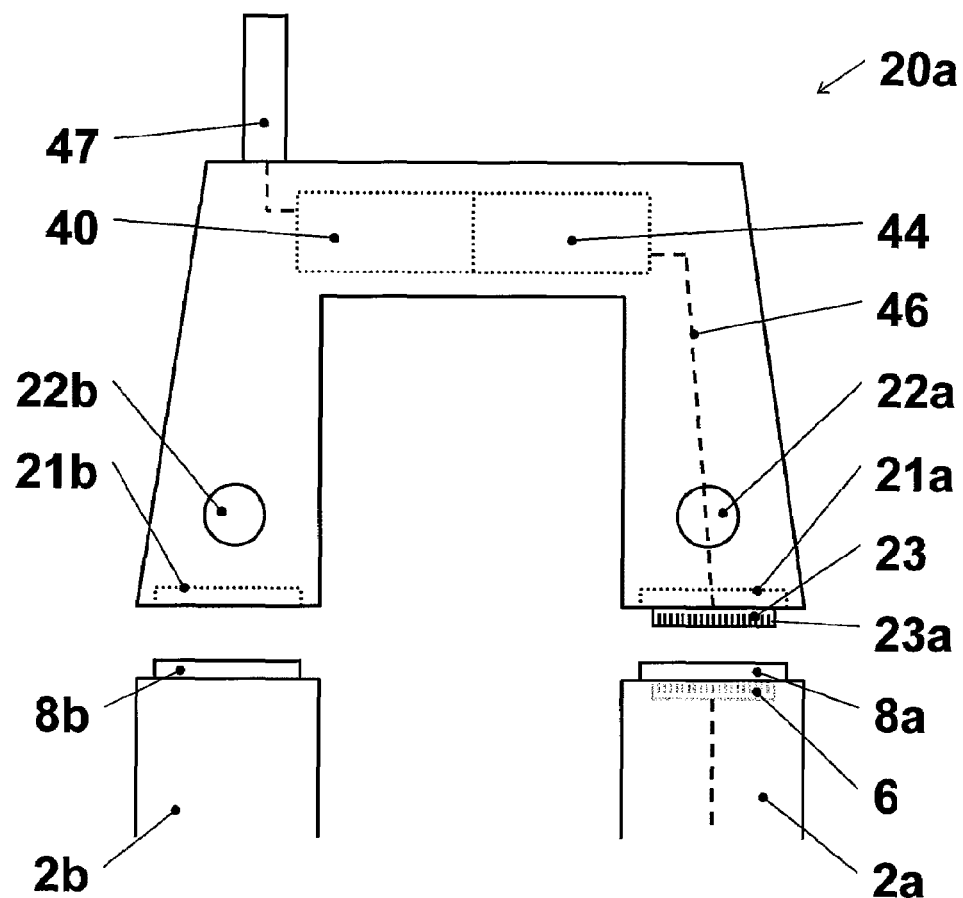
FIG. 1c shows the geodetic total station of FIG. 1a and FIG. 1b with the top attachment in the decoupled state, in a detailed side view.
Figure 2A:
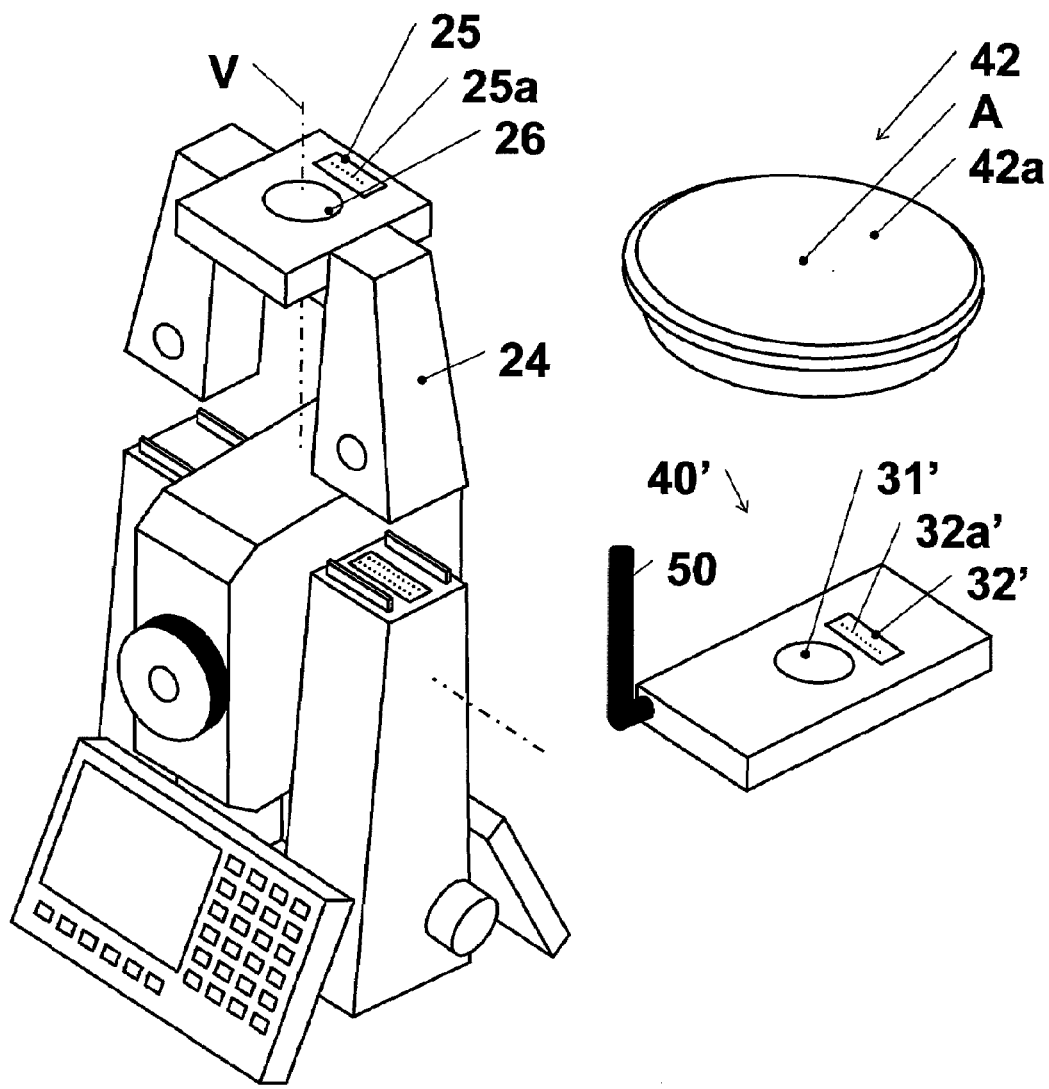
FIG. 2a shows a geodetic total station comprising a top attachment which has an adaptor bow and two peripheral components decoupled therefrom and in the form of a radio receiving unit and satellite position determination unit, in an oblique view.
Figure 2B:
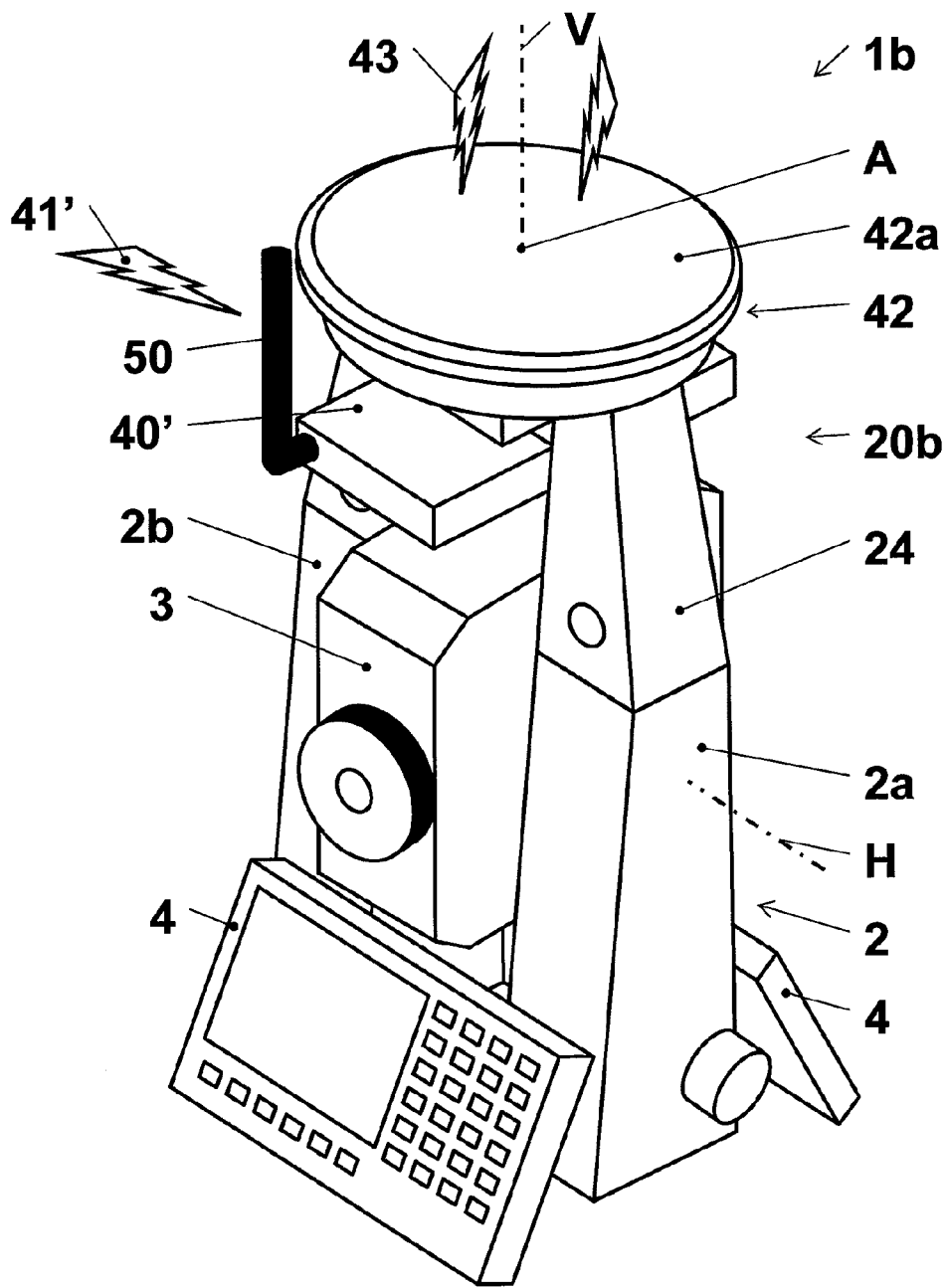
FIG. 2b shows the geodetic total station of FIG. 2a with the top attachment and the two peripheral components in the coupled state, in an oblique view.
Figure 2C:
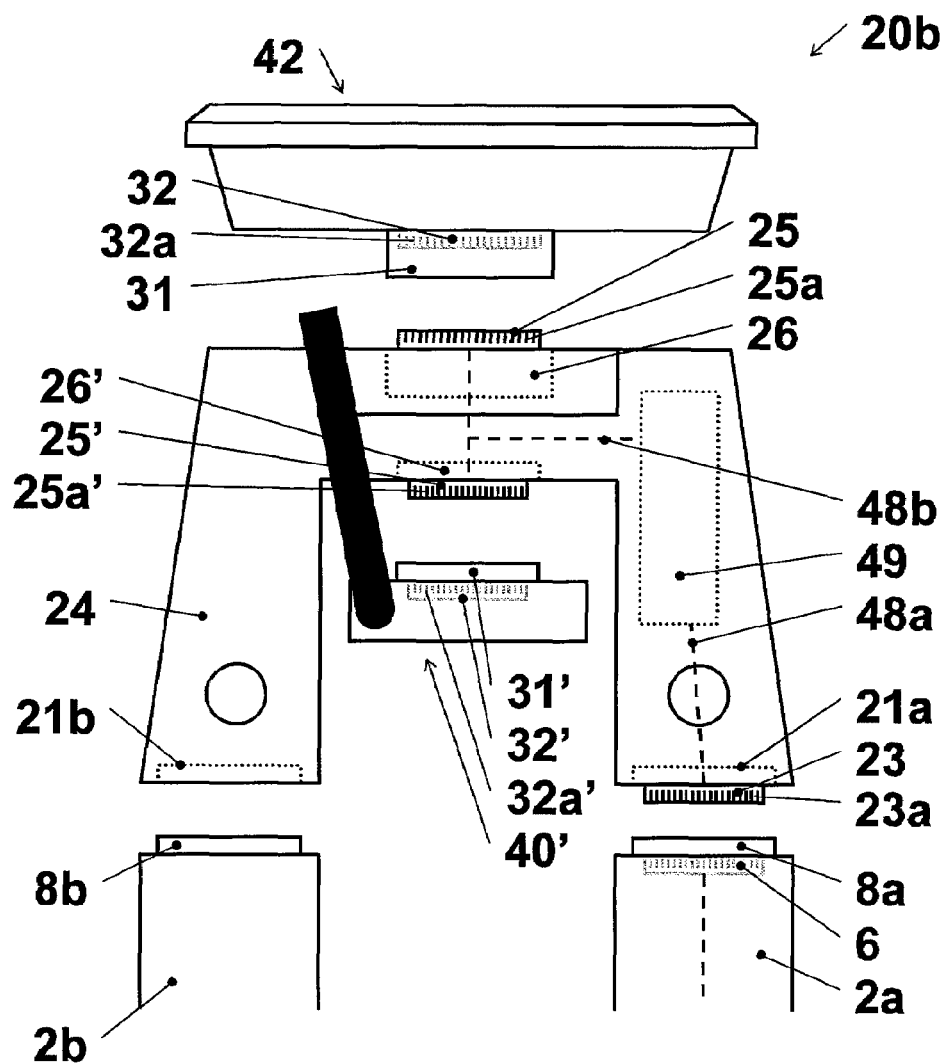
FIG. 2c shows the geodetic total station of FIGS. 2a and 2b with the top attachment and the two peripheral components in the decoupled state, in a detailed side view.

FIGS. 2a, 2b and 2c show, in a purely schematic diagram not to scale, a second possible embodiment of the total station according to the invention in different coupling states, views and degrees of detail. Since the differences from the first embodiment of FIGS. 1a, 1b and 1c are limited to the top attachment 20b of the upper part 1b, only the top attachment 20b will be explained below. In this embodiment, said top attachment is in the form of a plurality of parts, in contrast to the single-part formation in the first working example, and comprises an adaptor bow 24 and two peripheral components which once again can be detachably coupled mechanically to the adaptor bow 24. The adaptor bow 24 has two mechanical top attachment interfaces 21a, 21b and a top attachment data interface 23. The adaptor bow 24 thus corresponds with regard to its interfaces with the support 2 to the top attachment 20a from the first working example. Furthermore, the adaptor bow 24 comprises a first adaptor bow data interface 25, a second adaptor bow data interface 25', both of which have a data link to the top attachment data interface 23 via electrical connections 48a, 48b and an interface administration module 49 and in each case have electrical contact elements 25a and 25a', respectively, and a first and second mechanical adaptor bow interface 26, 26'. The first adaptor bow data interface 25 and the first mechanical adaptor bow interface 26 are present in the top of the adaptor bow 24, the first mechanical adaptor bow interface 26 being arranged centrally and symmetrically relative to the vertical axis V and said vertical axis passing centrally through it. The second adaptor bow data interface 25' and the second mechanical adaptor bow interface 26' on the other hand are present on the bottom of the adaptor bow 24.

The two peripheral components are in the form of a satellite position determination unit 42 for arrangement on the top of the top attachment 24 and in the form of a radio receiving unit 40' for arrangement on the bottom of the top attachment 24. A first mechanical peripheral component interface 31 centred relative to the antenna centre A and a first peripheral component data interface 32 with electrical contact elements 32a are formed on the bottom of the satellite position determination unit 42 with its satellite signal receiving antenna 42a with the antenna centre A, while a second mechanical peripheral component interface 31' and a second peripheral component data interface 32' with electrical contact elements 32a' are present on the top of the radio receiving unit 40' with its antenna 50. The peripheral components 42, 40' can be detachably coupled mechanically to the adaptor bow 24 via the mechanical peripheral component interfaces 31, 31'. The mechanical adaptor bow interfaces 26, 26', the mechanical peripheral component interfaces 31, 31', the adaptor bow data interfaces 25, 25' and the peripheral component data interfaces 32, 32' are each arranged and formed in such a way that the electrical contact elements 25a and 25a' of the adaptor bow interfaces 25 and 25', respectively, and the electrical contact elements 32a and 32a' of the peripheral component data interfaces 32 and 32', respectively, make mutual electrical contact by coupling the satellite position determination unit 42 or the radio receiving unit 40' to the adaptor bow 24, in particular with positive guidance. By means of the arrangement of the interfaces, the satellite signal receiving antenna 42a of the satellite position determination unit 42 is arranged on the top attachment 20 in such a way that the antenna centre A of the satellite signal receiving antenna 42a is forcibly centred on the vertical axis V. The satellite position determination unit 42 and the radio receiving unit 40' have in each case a data link to the display control unit 4 via the first and second peripheral component data interfaces 32 and 32', respectively, the first and second adaptor bow data interfaces 25 and 25', respectively, the electrical connections 48a, 48b, the interface administration module 49, the top attachment data interface 23 and the total station data interface 6.

Satellite signals 43, in particular GPS signals, are received by the satellite position determination unit 42 and are transmitted directly or indirectly to the display control unit 4. Thus, the absolute position of the total station can be determined with an accuracy of about 5 to 10 meters. For improving the accuracy of position determination, the radio receiving unit 40' receives radio signals 41', which are transmitted by a reference station (not shown) and correspond, for example, to the RTK or DGPS standard, and transmits these likewise directly or indirectly to the display control unit 4. The achievable accuracy of determination of the absolute position of the total station is thus less than 5 millimetres. In combination with a relative angle and distance measurement by the total station, it is therefore possible to determine the absolute position of a target point with high accuracy.

As a result of using the adaptor bow 24 described, the modular extendibility increases further. In this second embodiment, too, alternative peripheral components can be used. It is therefore possible to provide different radio receiving units for different reference station signals and different satellite position determination units 42 for various standards, for example GPS, GLONASS and GALILEO.

Of course, further alternative developments and embodiments of the invention, in particular of the arrangement and design of the mechanical and electrical interfaces, are possible.

The invention claimed is:

1. A geodetic total station for optical measurement of horizontal angles, vertical angles and distances to a target point a distance away, comprising:
    an upper part which is rotatable about a vertical axis and has a support with at least one support section;
    a sighting telescope which is arranged on the at least one support section and is rotatable relative to the support about a horizontal tilting axis and by which the target point can be sighted and the distance to the target point can be determined by electrosensory means;
    an electronic display control unit to which measured data acquired by electrosensory means are fed so that the position of the target point can be determined, optically displayed, and stored by the display control unit;
    at least one total station data interface having a data link to the display control unit and possessing electrical contact elements, for permitting a data link to at least one peripheral component; and
    a top attachment which is detachably coupled mechanically above the support and the telescope by at least one mechanical support interface arranged on the upward-pointing side of the at least one support section and at least one corresponding mechanical top attachment interface of the top attachment, wherein:
        the total station data interface is arranged on the upward-pointing side of the at least one support section;
        the top attachment comprises the at least one peripheral component and has at least one top attachment data interface which has electrical contact elements and possesses a data link to the peripheral component; and
        the mechanical support interface, the mechanical top attachment interface, the total station data interface, and the top attachment data interface are arranged and formed in such a way that the contact elements of the total station data interface and the contact elements of the top attachment data interface make mutual electrical contact by coupling the top attachment to the support section.

2. A geodetic total station according to claim 1, wherein the mechanical support interface, the mechanical top attachment interface, the total station data interface and the top attachment data interface are arranged and formed in such a way that the contact elements of the total station data interface and the contact elements of the top attachment data interface make mutual electrical contact by coupling the top attachment to the support section with positive guidance.

3. A geodetic total station according to claim 1, wherein:
    the support is in the form of a fork open at the top and includes two support sections between which the sighting telescope is arranged and a mechanical support interface; and
    the top attachment is detachably coupled mechanically above the upper part by two corresponding mechanical top attachment interfaces of the top attachment and connects the two support sections to one another.

4. A geodetic total station according to claim 1, wherein the top attachment comprises:
    an adaptor bow including:
        the at least one mechanical top attachment interface;
        the at least one top attachment data interface;
        at least one adaptor bow data interface which has a data link to the at least one top attachment data interface; and
        at least one mechanical adaptor bow interface; and
    the at least one peripheral component, which includes:
        a mechanical peripheral component interface, by which the peripheral component is mechanically coupled to the adaptor bow in such a way that it can be decoupled, and
        a peripheral component data interface, wherein the mechanical adaptor bow interface, the mechanical peripheral component interface, the adaptor bow data interface and the peripheral component data interface are arranged and formed in such a way that electrical contact elements of the adaptor bow data interface and electrical contact elements of the peripheral component data interface make mutual electrical contact by coupling the peripheral component to the adaptor bow—in particular with positive guidance.

5. A geodetic total station according to claim 4, wherein the mechanical adaptor bow interface, the mechanical peripheral component interface, the adaptor bow data interface and the peripheral component data interface are arranged and formed in such a way that electrical contact elements of the adaptor bow data interface and electrical contact elements of the peripheral component data interface make mutual electrical contact by coupling the peripheral component to the adaptor bow with positive guidance.

6. A geodetic total station according to claim 4, wherein:
    the top attachment includes two peripheral components; and
    the adaptor bow has two adaptor bow data interfaces and two mechanical adaptor bow interfaces, one of the two mechanical adaptor bow interfaces being arranged on the top of the adaptor bow centrally relative to the vertical axis.

7. A geodetic total station according to claim 6, wherein the adaptor bow has two adaptor bow data interfaces and two mechanical adaptor bow interfaces, one of the two mechanical adaptor bow interfaces being arranged on the top of the adaptor bow symmetrically relative to the vertical axis.

8. A geodetic total station according to claim 1, wherein:
    the peripheral component is in the form of a radio receiving unit for receiving radio signals; and
    the radio receiving unit has a data link to the display control unit.

9. A geodetic total station according to claim 8, wherein the radio receiving unit has a data link to the display control unit via the top attachment data interface and the total station data interface.

10. A geodetic total station according to claim 8, wherein the radio receiving unit includes a position determination unit configured to determine the position of the total station.

11. A geodetic total station according to claim 10, wherein the position determination unit includes a GPS receiving unit configured to receive satellite signals.

12. A geodetic total station according to claim 10, wherein the top attachment data interface and the total station data interface are configured to feed satellite position data to the display control unit.

13. A geodetic total station according to claim 10, wherein a satellite signal receiving antenna of the position determination unit is arranged on the top attachment in such a way that the antenna centre of the satellite signal receiving antenna is on the vertical axis.

14. A geodetic total station according to claim 1, wherein
the peripheral component includes a radio transmitting unit for transmitting radio signals; and
the radio transmitting unit includes a data link to the display control unit.

15. A geodetic total station according to claim 14, wherein the data link to the display control unit includes the top attachment data interface and the total station data interface.

16. A top attachment for a rotatable upper part of a geodetic total station, which upper part comprises a support which is open at the top and in the form of a fork and has two support sections both of which have in each case at least one mechanical support interface on the upward-pointing side and at least one of which has, on the upward-pointing side, a total station data interface having a data link to a display control unit of the total station and possessing electrical contact elements for permitting a data link to at least one peripheral component, the top attachment comprising:
mechanical top attachment interfaces which correspond to the mechanical support interfaces and are arranged and formed in such a way that the top attachment can be detachably coupled mechanically above the support; and
at least one peripheral component that has at least one top attachment data interface which has electrical contact elements and possesses a data link to the peripheral component, wherein the mechanical top attachment interfaces and the top attachment data interface are arranged and formed, relative to the mechanical support interfaces and the total station data interface, in such a way that the contact elements of the total station data interface and the contact elements of the top attachment data interface make mutual electrical contact by coupling the top attachment to the support section.

17. A top attachment according to claim 16, wherein the mechanical top attachment interfaces and the top attachment data interface are arranged and formed, relative to the mechanical support interfaces and the total station data interface, in such a way that the contact elements of the total station data interface and the contact elements of the top attachment data interface make mutual electrical contact by coupling the top attachment to the support section with positive guidance.

18. A top attachment according to claim 16, wherein the top attachment further comprises:
an adaptor bow including:
the at least one mechanical top attachment interface;
the at least one top attachment data interface;
at least one adaptor bow data interface which includes a data link to the at least one top attachment data interface; and
at least one mechanical adaptor bow interface; and
the at least one peripheral component including:
a mechanical peripheral component interface, of which the peripheral component is mechanically coupled to the adaptor bow in such a way that it can be decoupled; and
a peripheral component data interface, wherein the mechanical adaptor bow interface, the mechanical peripheral component interface, the adaptor bow data interface, and the peripheral component data interface, are arranged and formed in such a way that electrical contact elements of the adaptor bow data interface and electrical contact elements of the peripheral component data interface make mutual electrical contact by coupling the peripheral component to the adaptor bow.

19. A top attachment according to claim 16, wherein the peripheral component includes a radio receiving unit for receiving radio signals, a satellite position determination unit, or a radio transmitting unit for transmitting radio signals.

20. A top attachment according to claim 19, wherein the peripheral component includes a LIPS receiving unit, for receiving satellite signals.

* * * * *